B. ATKINSON.
DRINKING FOUNTAIN FOR STOCK.
APPLICATION FILED APR. 19, 1920.
1,364,473.
Patented Jan. 4, 1921.
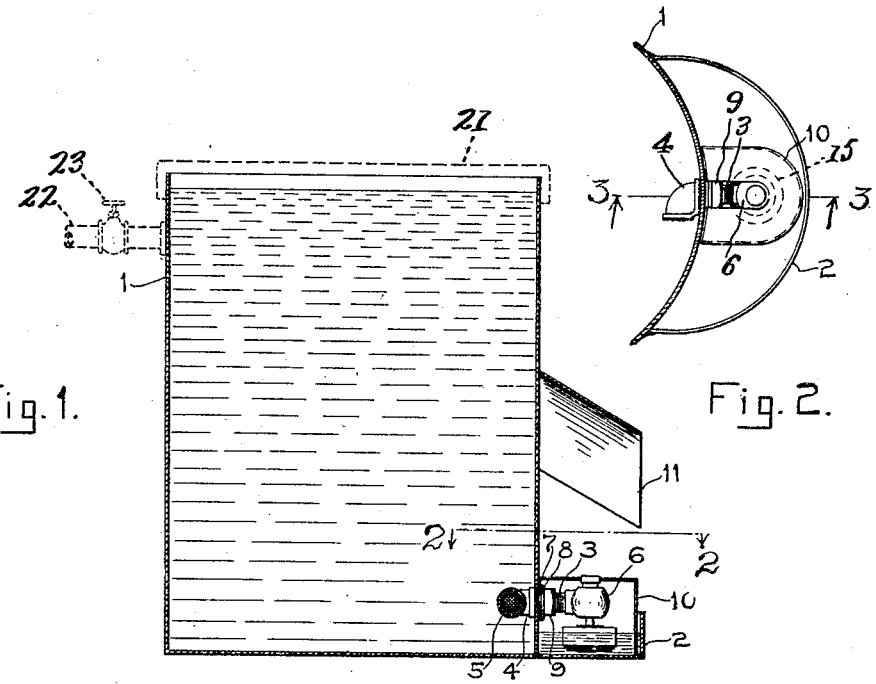
Fig. 1.
Fig. 2.
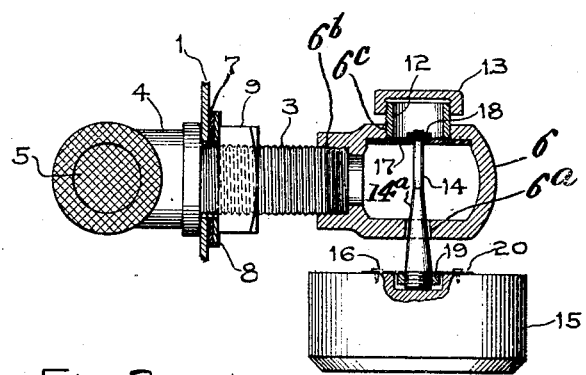
Fig. 3.
Inventor.
Benjamine Atkinson.
by Wilkinson & Giusta,
Attorneys.

UNITED STATES PATENT OFFICE.

BENJAMINE ATKINSON, OF SALT LAKE CITY, UTAH.

DRINKING-FOUNTAIN FOR STOCK.

1,364,473.  Specification of Letters Patent.  Patented Jan. 4, 1921.

Application filed April 19, 1920. Serial No. 375,091.

*To all whom it may concern:*

Be it known that I, BENJAMINE ATKINSON, a British subject, residing at Salt Lake City, county of Salt Lake, and State of Utah, have invented certain new and useful Improvements in Drinking-Fountains for Stock; and I do hereby declare the following to be a full, clear, and exact description of the invention, such as will enable others skilled in the art to which it appertains to make and use the same.

My invention relates to improvements in drinking troughs for animals of various kinds.

It is primarily intended for use in watering poultry, but is capable of being made on a larger scale for use with larger animals, such as hogs, sheep and stock generally.

The invention is intended to provide a cheap, simple and efficient apparatus which can be conveniently transported from place to place, the parts of which can be conveniently cleaned when desired, and in which the water is supplied to the animals in a strained condition and in which it is in a large measure protected from the presence of foreign matter.

The invention also includes means whereby the operative parts for supplying the water are protected against accidental injury.

The invention will be more fully understood after reference to the accompanying drawings, in which like parts are indicated by similar reference symbols throughout the several views, and in which:—

Figure 1 is a sectional elevation showing the main supply tank with the water trough and shed for same connected thereto, and with the automatic supply control apparatus shown in elevation.

Fig. 2 shows a section along the line 2—2 of Fig. 1, and looking down; and

Fig. 3 shows a section along the line 3—3 of Fig. 2, the parts being shown in elevation.

1 represents the supply receptacle which can be preferably a metal tank of either cylindrical or rectilineal shape, to which is connected, preferably by soldering, a trough 2, which trough is preferably crescent-shaped as shown in Fig. 2 so as to secure the advantage of the strength of the arch and the avoidance in a large measure of angular corners in which foreign matter can accumulate; thus the trough can be more conveniently cleaned out when desired.

Projecting from the side of the tank above the trough is a delivery pipe having the screw-threaded ends 3 projecting outward, and provided inside the tank with an L 4 carrying on its open mouth the wire screen 5, as shown most clearly in Fig. 3. Secured to the screw-threaded ends 3 of the delivery pipe is a hollow valve casing 6, which is provided with a tapered valve seat $6^a$ screw-threaded, as at $6^b$, to screw on the delivery pipe, and is also provided with a screw-threaded pipe $6^c$ for purposes which will be hereinafter described.

A tight joint is made where the delivery pipe passes through the side of the tank in any convenient way, as by means of the rubber gasket 7, metal washer 8 and the nut 9.

Fitting over the operative parts of the valve mechanism there is a cover 10 which protects said mechanism from accidental injury, or from becoming clogged up from dirt, or foreign matter accumulating on the same.

I may provide an inclined shed 11 secured to the side of the tank mounted above the trough, which will in a large measure prevent dust, leaves or the like from falling into the trough and fouling the water therein.

Mounted in the top part of the valve casing is a sleeve 12 which is screw-threaded to engage the screw threads $6^c$ and is covered by the screw-threaded cap 13.

14 represents a valve stem carrying the tapered valve $14^a$ which fits snugly on the valve seat $6^a$ when the float 15 is raised by the pressure of the water in the trough. This valve stem 14 passes freely through the removable guide plate 17 and is held against dropping out by a nut 18, which nut and the head of the valve stem project up into the sleeve 12, when the valve is lifted. The lower end of the valve stem is secured to the float 15 in any convenient way, as by the nut 11, engaging beneath the disk 20 attached to the float by the screws or bolts 16. This float 15 may be of any suitable material, such as wood or cork, or if desired a hollow metal float may be used.

The receptacle 1 is preferably closed by a suitable cover 21 and may be filled by hand, or may be supplied with water from any suitable source of supply through a pipe 22 controlled by a valve 23, as indicated in dotted lines in Fig. 1.

The operation of the device is as follows:

If both the tank 1 and the trough 2 be empty, when water is poured into the tank and rises above the screen 5 it will flow through the screen and through the delivery pipe into the valve casing 6, and past the valve seat 6$^a$ into the trough. When the water has risen in the trough to a sufficient height the float 15 will automatically cause the valve 14$^a$ to close the passage by the valve seat, and a further influx of water into the trough will be arrested. As soon as the surface of the water in the trough is sufficiently lowered, either by evaporation, or by the drinking of the water by the animals, the float will fall again, lowering the valve and permitting the flow of sufficient water into the trough 2 to again lift the float and again close the valve.

The cycle of operations will continue indefinitely until the level of the water in the tank 1 has fallen too low, when the tank should be refilled.

In order to overhaul or clean the various parts, lift off the cover 10, unscrew the cap 13, take off the nut 18, then turn the valve casing 6 through a sufficient angle, to permit the valve stem 14 to be drawn sidewise of the trough until the valve stem is out of the casing, then unscrew the valve casing, clean out the same, clean out the supply tank, and clean off the screen 5, also clean out the trough 2. To assemble the parts reverse the operation.

By having the inner orifice of the supply pipe in the form of an L, this pipe may be more conveniently held while the nut 9 is being set up, and when the said nut is being turned for removing the supply pipe from the apparatus.

It will be obvious that various modifications might be made in the herein described apparatus, and in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. Apparatus of the character described comprising a main supply receptacle provided with a trough attached to the lower side of said receptacle exterior thereto, a delivery pipe opening from the interior of said receptacle and having its outer end screw threaded and projecting above said trough, a hollow valve casing screwed on the outwardly projecting end of said delivery pipe, and provided with a tapered valve seat in its bottom and with an opening in the top, a valve stem provided with a tapered portion near its lower end forming a valve, a removable guide plate mounted in said casing and engaging said valve stem, and a float attached to the lower end of said valve stem and mounted inside said trough, substantially as described.

2. Apparatus of the character described comprising a main supply receptacle provided with a trough attached to the lower side of said receptacle exterior thereto, a delivery pipe opening from the interior of said receptacle and having its outer end screw threaded and projecting above said trough, a hollow valve casing screwed on the outwardly projecting end of said delivery pipe, and provided with a tapered valve seat in its bottom and with an opening in the top, a valve stem provided with a tapered portion near its lower end forming a valve, a removable guide plate mounted in said casing and engaging said stem, a nut on the upper end of said stem above said guide plate, and a float attached to the lower end of said valve stem and mounted inside said trough, substantially as described.

BENJAMINE ATKINSON.